United States Patent
Bruder

(10) Patent No.: US 10,335,815 B2
(45) Date of Patent: Jul. 2, 2019

(54) APPLICATOR HEAD FOR A DISPENSER, DISPENSER COMPRISING AN APPLICATOR HEAD, AND METHOD FOR PRODUCING AN APPLICATOR HEAD

(71) Applicant: APTAR RADOLFZELL GMBH, Radolfzell (DE)

(72) Inventor: Thomas Bruder, Constance (DE)

(73) Assignee: APTAR RADOLFZELL GMBH, Radolfzell (DE)

(*) Notice: Subject to any disclaimer, the term of this patent is extended or adjusted under 35 U.S.C. 154(b) by 0 days.

(21) Appl. No.: 15/125,754

(22) PCT Filed: Jan. 30, 2015

(86) PCT No.: PCT/EP2015/051989
§ 371 (c)(1),
(2) Date: Sep. 13, 2016

(87) PCT Pub. No.: WO2015/135689
PCT Pub. Date: Sep. 17, 2015

(65) Prior Publication Data
US 2017/0001210 A1    Jan. 5, 2017

(30) Foreign Application Priority Data

Mar. 14, 2014 (DE) .......... 10 2014 204 831

(51) Int. Cl.
*B05B 11/00* (2006.01)
*A45D 34/04* (2006.01)
(Continued)

(52) U.S. Cl.
CPC .......... *B05B 11/3033* (2013.01); *A45D 34/00* (2013.01); *A45D 34/04* (2013.01);
(Continued)

(58) Field of Classification Search
CPC ................... B05B 11/3033; B05B 11/3032
(Continued)

(56) References Cited

U.S. PATENT DOCUMENTS 3,726,442 A    4/1973    Davidson et al.
3,820,689 A    6/1974    Cocita
(Continued)

FOREIGN PATENT DOCUMENTS

CN    102448355 A    5/2012
CN    102849323 A    1/2013
(Continued)

OTHER PUBLICATIONS

Search Report of Chinese Patent Office issued in Application No. 201580013690.7 with English translation, dated Apr. 26, 2017 (8 pages).
(Continued)

*Primary Examiner* — Jeremy Carroll
(74) *Attorney, Agent, or Firm* — Flynn Thiel, P.C.

(57) ABSTRACT

An applicator head for a dispenser for cosmetic or pharmaceutical liquids and foodstuffs, having a pump device with a pump chamber, an inlet valve arranged between a suction intake and the pump chamber, an outlet valve arranged between the pump chamber and an applicator opening, and an actuating arrangement with the aid of which an inner volume of the pump chamber is changed. At least two of the three components from the group including the outlet valve, the inlet valve, and the actuating arrangement each include at least one elastic section formed from an elastically deformable material, the elastic sections of the at least two components are integral parts of an interlinked elastic component section of a uniform elastic material having a connection area between the at least two components, and the
(Continued)

US 10,335,815 B2

Page 2 connection area, in the installed state of the application head, is in an elastically deformed state.

13 Claims, 2 Drawing Sheets

(51) Int. Cl.
| | |
|---|---|
| *B29C 45/16* | (2006.01) |
| *B29C 45/00* | (2006.01) |
| *A45D 34/00* | (2006.01) |
| *B29C 45/14* | (2006.01) |
| *B29L 23/20* | (2006.01) |
| *B29K 21/00* | (2006.01) |
| *B29K 23/00* | (2006.01) |
| *B29K 623/00* | (2006.01) |

(52) U.S. Cl.
CPC ........ *B05B 11/3032* (2013.01); *B29C 45/006* (2013.01); *B29C 45/14065* (2013.01); *B29C 45/1676* (2013.01); *A45D 2200/056* (2013.01); *A45D 2200/057* (2013.01); *B29C 45/0081* (2013.01); *B29K 2021/003* (2013.01); *B29K 2023/12* (2013.01); *B29K 2623/12* (2013.01); *B29L 2023/20* (2013.01)

(58) Field of Classification Search
USPC ......................................................... 222/213
See application file for complete search history.

(56) References Cited

U.S. PATENT DOCUMENTS

| | | | | | |
|---|---|---|---|---|---|
| 5,099,885 | A | * | 3/1992 | Nilsson | B05B 11/3032 137/852 |
| 5,271,432 | A | * | 12/1993 | Gueret | B05B 11/0043 137/854 |
| 5,492,252 | A | * | 2/1996 | Gueret | B05B 11/0016 222/207 |
| 5,505,341 | A | * | 4/1996 | Gueret | B05B 11/3032 222/207 |
| 5,871,126 | A | * | 2/1999 | Bennett | B05B 11/0018 222/207 |
| 8,308,022 | B2 | | 11/2012 | Barre et al. | |
| 8,733,566 | B2 | | 5/2014 | Druitt et al. | |
| 8,998,591 | B2 | | 4/2015 | Han de Man | |
| 9,096,362 | B2 | | 8/2015 | Von Schuckmann | |
| 9,228,583 | B2 | | 1/2016 | Cui et al. | |
| 9,283,582 | B2 | | 3/2016 | Han de Man et al. | |
| 2008/0169261 | A1 | | 7/2008 | Druitt et al. | |
| 2009/0302064 | A1 | | 12/2009 | Lavabre | |
| 2010/0252577 | A1 | * | 10/2010 | Neuhaus | B05B 11/3032 222/207 |
| 2011/0031278 | A1 | | 2/2011 | Han de Man | |
| 2012/0014824 | A1 | | 1/2012 | Han de Man | |
| 2012/0097709 | A1 | | 4/2012 | Han de Man et al. | |
| 2014/0105735 | A1 | | 4/2014 | Cui et al. | |
| 2014/0190995 | A1 | | 7/2014 | Von Schuckmann | |

FOREIGN PATENT DOCUMENTS

| | | |
|---|---|---|
| DE | 10 2006 028 106 A1 | 12/2007 |
| DE | 50 2004 010 654 T2 | 12/2008 |
| DE | 60 2005 004 565 T2 | 1/2009 |
| DE | 10 2011 052 954 A1 | 2/2013 |
| EP | 0 442 857 A1 | 8/1991 |
| FR | 2 127 774 | 10/1972 |
| GB | 1 220 980 | 1/1971 |
| WO | WO 2004/073873 A2 | 9/2004 |

OTHER PUBLICATIONS

International Search Report issued in Application No. PCT/EP2015/051989 with English translation dated Jul. 16, 2015 (11 pages).
Written Opinion of International Searching Authority issued in Application No. PCT/EP2015/051989 dated Jul. 16, 2015 (7 pages).

* cited by examiner

APPLICATOR HEAD FOR A DISPENSER, DISPENSER COMPRISING AN APPLICATOR HEAD, AND METHOD FOR PRODUCING AN APPLICATOR HEAD

FIELD OF USE AND PRIOR ART

The invention relates to an applicator head for a dispenser, in particular for applying cosmetic or pharmaceutical liquids or for applying foodstuffs. Moreover, the invention also relates to a dispenser having such an applicator head, and to methods for producing such an applicator head.

In dispensers for said media, applicator heads of the type in question are in most cases mounted on a liquid reservoir or are connected in one piece to such a liquid reservoir. They allow liquid to be applied from the liquid reservoir. They usually have an applicator opening and an actuating handle, by means of which liquid can be conveyed from the liquid reservoir to the applicator opening.

Applicator heads and dispensers of the type in question are used for a large number of products that have a low retail price. It is therefore of great importance that the applicator heads and dispensers can themselves be produced cost-effectively and that their individual components can be assembled in a particularly cost-effective manner.

Such applicator heads, which are in most cases equipped with an actuating handle and/or valves of a pump mechanism, nowadays usually consist of several individual parts which are produced separately and then have to be assembled. Cost-effective assembly of several individual components presents a technical challenge.

Problem and Solution

The problem addressed by the invention is primarily to make available an applicator head which is of the type in question and which permits cost-effective production and assembly.

According to a first aspect of the invention, an applicator head according to the invention is an applicator head with a pump device which has a pump chamber, an inlet valve, which is arranged between a suction opening and the pump chamber, an outlet valve, which is arranged between the pump chamber and the applicator opening, and an actuating handle, by means of which an inner volume of the pump chamber can be changed.

The applicator head according to this first aspect of the invention thus has all the components that it needs to convey liquid from the liquid reservoir to the applicator opening. The inlet valve and the outlet valve are usually designed to open in a pressure-dependent manner. An overpressure for the purpose of application, by which the applicator valve is opened when the inlet valve is closed, can be generated by changing the inner volume of the pump chamber. The resetting of the actuating handle generates an underpressure for the purpose of sucking liquid out of the liquid reservoir, wherein the outlet valve is closed and the inlet valve opened.

According to the invention, provision is made that, of the three components outlet valve, inlet valve and actuating handle, at least two have an elastic portion which is made of an elastically deformable material. These elastic portions of the at least two components are an integral part of a common elastic structural portion which is made of the elastic material and which in addition to the elastic portions of the at least two components also forms a connection area between these components. Said connection area, in the assembled state of the applicator head, is in an elastically deformed state.

Thus, in an applicator head according to the invention, at least two parts which are intentionally elastic are formed by a common structure, which may for example consist of an elastomer plastic. In the case of the inlet valve and the outlet valve, they are preferably valve lips or other valve portions that are intentionally deflected for opening the valve under the effect of deformation. In the case of the actuating handle, it is in particular an actuating surface which delimits the pump chamber and the deformation of which consequently influences the inner volume of the pump chamber. Said at least two components are formed together with the connection area, or in the case of more than two components possibly also the plurality of connection areas, as an integral structural portion which in the assembled state of the applicator head is however deformed in relation to the production state, such that the connection area between the two components is permanently in an elastically tensioned state.

The at least two components are in themselves movable. However, they are nevertheless preferably components that are in a fixed position with regard to respectively provided holding portions. The connection area existing between them is therefore not elastic to allow a relative movement in relation to each other, but to allow joint production of different components that are in a fixed position in relation to each other during operation. The deformation occurring in the connection area is accordingly a permanent deformation, which does not undergo a cyclical change, for example with each pump stroke.

In connection with this invention, the assembled state of the applicator head is understood as meaning that the applicator head is operationally ready, that is to say a reduction in the size of the pump chamber for the purpose of a pumping operation is possible by intentional actuation of the actuating handle.

The invention allows the production of an applicator head of the type in question to be favorably realized, since individual elastic components that are required for the functioning of the applicator head can be produced together, even if this joint production can expediently only take place in a relative arrangement of the components during production that differs from the relative arrangement in the assembled applicator head. Thus, for example, two components that are arranged relative to each other in the assembled state in such a way that production taking place in the same state would not be possible without undercuts, can nevertheless be produced integrally as a result of the configuration according to the invention with the connection area deformed in the assembled state and only be bought into a different relative position in the course of assembly. Apart from the more favorable production of the corresponding plastic structure, its advantage is also that automated assembly is simplified if the two components, for example the inlet valve and the actuating handle, are already only movable to a limited extent with respect to each other as a result of the connection area connecting them.

The deformation of the connection area is preferably a deformation as a kink along a straight kink axis. In particular, it is preferably an angle of 90° or a multiple thereof by which the connection area is kinked and the two components of the elastic structural portion are displaced relative to each other in the assembled state of the applicator head. Thus, for example, a connection area kinked by 90° may be provided between an inlet valve and an outlet valve that is at a 90° angle to an inlet direction. The same arrangement of the components could however also be achieved by two or three kink areas totaling 270°.

It is of particular advantage if at least three components are part of a common elastic structural portion, these three components being chosen from the group of altogether four components, which apart from the inlet valve, the outlet valve and the actuating handle also includes a seal. This seal may act between two housing portions that are preferably made of a more rigid material. It is preferably provided in this case that two connection areas that in the assembled state of the applicator head are respectively in an elastically deformed state are located between the at least three components. Thus, a chain-like arrangement of an inlet valve, an outlet valve and the actuating handle can be provided in particular, all three components assuming a different relative position relative to the other two components respectively in relation to their arrangement in the production state. Various sequences of the components in the chain-like arrangement are conceivable here.

A second aspect of the invention, which is preferably realized together with the first aspect of the invention, provides that an applicator head of the type in question for a dispenser has a structure which is produced in a multi-component injection mold and which has at least two rigid structural portions made of rigid plastic, for example PP, which structural portions are connected by at least one elastic structural portion made of an elastic plastic, for example a TPE, wherein the two rigid structural portions, in the assembled state of the applicator head, have a relative position which is altered in relation to a production state of the structure, such that the elastic structural portion is elastically deformed in the assembled state of the applicator head.

Such an applicator head consequently has two rigid structural portions, which do not have to be produced from the same material or from material of the same rigidity, but preferably consist of identical plastics material. These two rigid structural portions are connected by a structural portion made of more elastic material. This composite of two rigid portions and one elastic portion is produced in a multi-component injection mold, which is understood as meaning that the respective plastics are connected in a transitional area in a way that is only possible by melting. Such multi-component injection-molded parts are usually produced by an injection-molding cavity at first having a smaller free volume, which is completely filled by a first plastic that is introduced. Subsequently, the cavity in which the injection molding takes place is increased in comparison with the initial state and a second plastic is fed in, melting the first plastic in boundary areas and entering into an intimate bond with it.

An applicator head according to the second aspect of the invention provides that such a composite part is produced from at least two grades of plastic, in order thereby in particular also to facilitate assembly. The elastic structural portion allows the two more rigid structural portions to be displaced relative to each other after production, and in particular to be coupled to each other with a form fit or a force fit, for example by means of latching, and consequently to assume their relative position in the assembled state. The fact that said structural portions form a composite means that they can be handled and assembled particularly easily. The elastic structural portion limits the relative mobility of the more rigid structural portions in the course of assembly.

In the same way as already described with respect to the first aspect of the invention, the elastic structural portion is preferably kinked in order to alter the alignment of the two rigid structural portions relative to each other. In particular, the elastic structural portion is preferably deformed in such a way that the two more rigid structural portions are pivoted with respect to each other by 180° in relation to their relative position in the production state. They can thus form two individual portions, produced next to each other, of a housing of the applicator head that are fitted one on the other or one in the other by the folding referred to.

In such a case the elastic structural portion assumes the function of a joint. However, the function of the elastic structural portion does not have to be restricted to the coupling of the rigid structural portions and the assistance of the relative movement of the same, but instead it preferably performs further functions.

Thus, it is of advantage in particular if the elastic structural portion also has a sealing portion which seals off a contact area of the two rigid structural portions in the assembled state of the applicator head. This is preferably an axially acting sealing portion which, by joining together the two rigid structural portions, is pressed together and creates a sealed connection. This sealing portion may be provided in particular in the area of a pump chamber that is jointly delimited by the two more rigid structural portions. It is particularly advantageous here if one of the more rigid structural portions has a peripheral groove-like depression, which is filled by the elastic material and, when the other rigid portion is fitted in, forms the supporting surface thereof.

Other components of which one, some or all may likewise be included in the elastic structural portion are an elastically deformable portion of an inlet valve, an elastically deformable portion of an outlet valve or an elastically deformable portion of an actuating handle. These are the portions already mentioned with respect to the first aspect of the invention, which in connection with a pump mechanism are preferably formed as elastic portions. In the case of an actuating handle, it preferably acts together with the two rigid structural portions to delimit a pump chamber and by deforming can influence the inner volume thereof. In the case of the valves, they are preferably sealing lips or other surface portions that lie elastically against opposing surfaces and, as a result of corresponding pressure conditions on both sides, can be lifted off from the opposing portion for opening the respective valve or can be pressed against the opposing portion. Said components or their elastic portions may be provided in a fixed position on one of the rigid portions, which is to be understood as meaning that they are displaced together with these portions during assembly. The components may, however, also be movable in relation to the rigid portions and possibly be kept in position jointly by the two rigid portions in the assembled state. It is of advantage in particular if the inlet valve is positionally fixed on a first of the rigid structural portions and/or the actuating handle is positionally fixed on the second of the rigid structural portions.

As far as the functions of the two rigid structural portions are concerned, it is regarded as advantageous if a first rigid structural portion has a peripheral wall portion which, to one side, is closed by an elastic portion of the actuating handle, which elastic portion forms a deformable actuating surface. The second rigid structural portion is preferably provided with a coupling device for coupling to a liquid reservoir. The second rigid structural portion preferably forms part of the inner wall of a pump chamber, which is otherwise delimited by the inner side of said peripheral wall portion of the first rigid structural portion and the inner side on this provided deformable actuating surface.

Said elastic components that can be formed by the elastic structural portion may be positionally fixed in the way already described in relation to one of the rigid structural portions, such that they do not move relatively in relation to this rigid structural portion in the course of the assembly of the applicator head. However, a particularly advantageous design provides with regard to one or more of these components that it is arranged in a receiving area that is formed jointly by the two rigid portions or wall portions provided on them, which in the assembled state of the applicator head are pushed one into the other, such that said receiving area remains free between them and can receive an elastic component. In particular, the component that is positionally fixed jointly by the two rigid structural portions in this way, and only in the assembled state, may be an outlet valve that connects the pump chamber to a surrounding atmosphere. Of this outlet valve, a surface portion that surrounds a valve opening and serves for the fixing may in particular be arranged in said receiving area.

As already mentioned, the inlet valve and the outlet valve in particular may also be formed at least in certain portions by the elastic material of the elastic structural portion. It is of advantage if the outlet valve and/or the inlet valve are designed as valves with a closable through-opening, wherein this through-opening is completely surrounded by elastic material of the elastic structural portion. They are preferably valves in which all of the portions that are essential for the valve function are formed by the elastic structural portion, such that the functioning of the valve is even ensured when the corresponding individual portion of the elastic structural portion is not perfectly positioned during assembly.

The invention additionally relates to a dispenser, in particular for applying cosmetic or pharmaceutical liquids or else foodstuffs that has a liquid reservoir and an applicator head of the type described above. The applicator head is preferably formed as a separate subassembly, which can be coupled to the liquid reservoir. However, it is alternatively also conceivable that the liquid reservoir is connected fixedly, and in particular integrally, to one of the two rigid structural portions of the applicator head.

The invention additionally also relates to the production method for producing the applicator head according to the aforementioned first and second aspects of the invention.

BRIEF DESCRIPTION OF THE DRAWINGS

Further aspects and advantages of the invention will become clear from the following description of a preferred illustrative embodiment of the invention, which is explained with reference to the figures, where.

DETAILED DESCRIPTION OF THE ILLUSTRATIVE EMBODIMENT(S)

Figure 1:
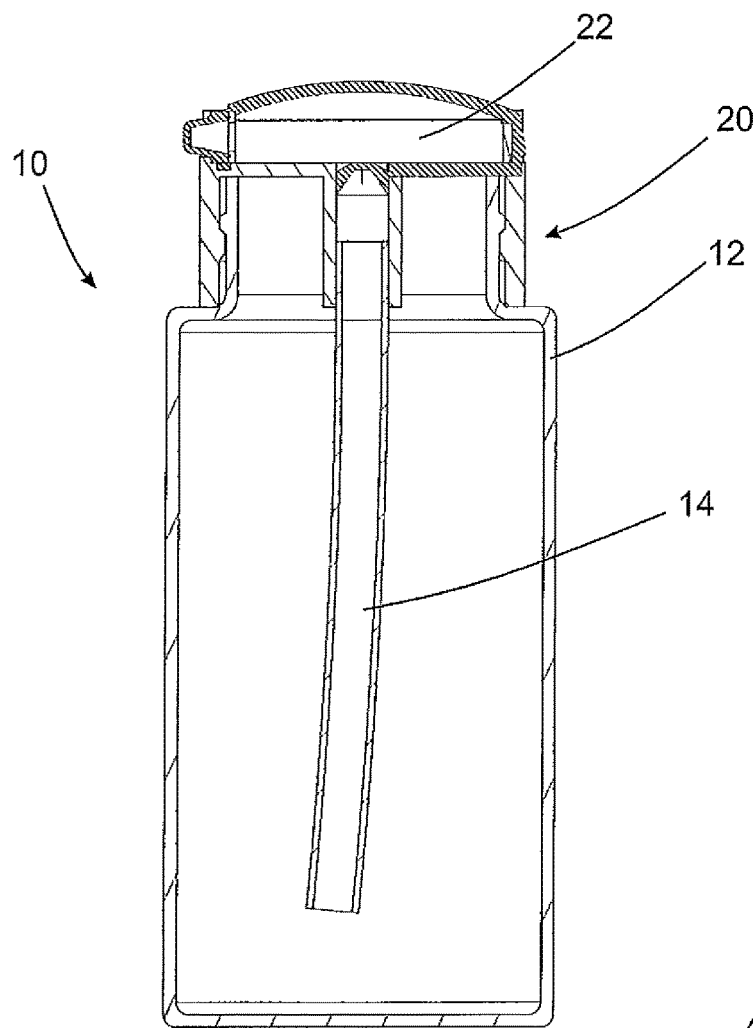
FIG. 1 shows a sectioned side view of a dispenser according to the invention with an applicator head according to the invention.

FIG. 1 shows a dispenser 10 according to the invention, comprising a media reservoir 12 and an applicator head 20.

The dispenser 10 can be used in particular for cosmetic liquids such as creams and lotions or for foodstuffs such as ketchup or mustard. A use for pharmaceutical liquids is also possible.

The dispenser 10 is distinguished by its low production costs. In addition to said liquid reservoir 12 and a riser pipe 14, there is only one further structure, and the latter forms the entire applicator head 20.

This structure forming the applicator head 20 is a structure which is produced by multi-component plastics injection-molding. With this type of production, different plastics can be shaped, by sequential introduction into an injection molding cavity, in order to form a uniform structure, of which the constituent portions made of different plastic are connected to each other intimately by cohesive bonding. Although the use of this multi-component injection molding is regarded as very advantageous here, certain aspects of the invention may also be advantageous in an alternative production in which the rigid structural portions, described below, and the elastic structural portion of the applicator head 20 are produced separately and are connected to each other only after this separate production.

Figure 2:
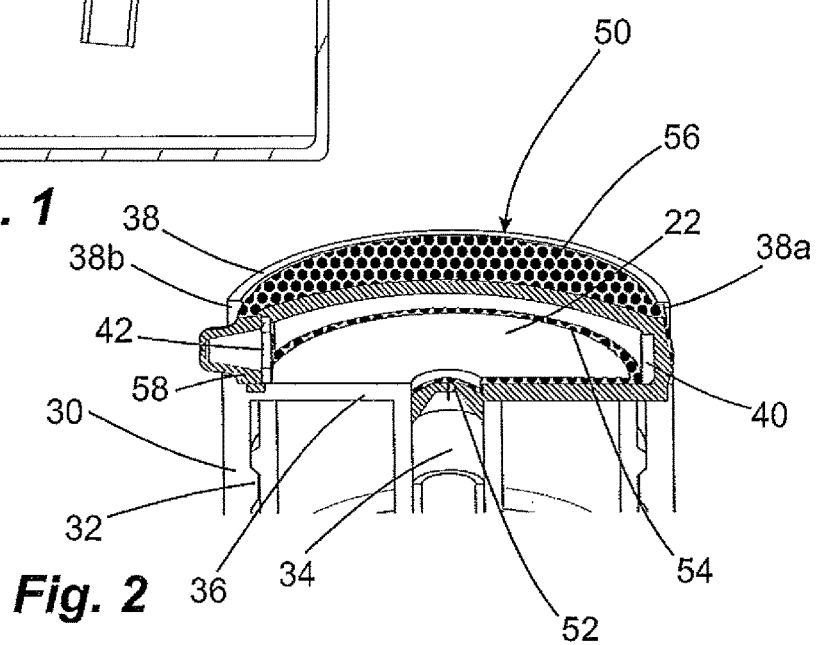
FIG. 2 shows a sectioned perspective view of the applicator head of the dispenser according to FIG. 1, FIGS. 3A and 3B show the applicator head of the dispenser from FIG. 1 in its state after production and before assembly.

The applicator head 20 is shown enlarged in FIG. 2. It has a total of three structural portions 30, 40, 50.

A first rigid structural portion 30 made of polypropylene (PP) is provided to be secured on the liquid reservoir and for this purpose has a latching coupling mechanism 32. This first structural portion moreover has an inflow channel 34, which opens into a pump chamber 22, of which the lower closure surface 36 is likewise formed by the first rigid structural portion 30. Moreover, the first rigid structural portion 30 makes available a substantially circumferential trim 38, which is interrupted only in two areas 38a, 38b.

The second rigid structural portion 40, likewise made of polypropylene, is an annular structural portion, which is provided with an aperture 42 only in the area of an applicator channel.

The third structural portion of the dispenser 20 is a structural portion made of an elastic material such as TPD. Its section faces are shown by hatching in FIG. 2. Its surfaces are shown by dots.

This third structural portion 50 forms a series of subsidiary components of the applicator head 20. Thus, in particular, it forms a slit valve 52, which is arranged in the inflow channel 34 and opens when there is an underpressure in the pump chamber 22, a peripheral seal 54, which is provided in an outer depression of the surface 36, an actuating handle 56, which lies opposite the surface 36 and delimits the pump chamber 22, and an outlet valve 58, which is likewise configured as a slit valve and which is arranged such that it protrudes through the interruption 38b in the trim 38 and can be supplied with liquid through the opening 42 in the second rigid structural portion 40.

During the operation of the assembled dispenser, the components 52, 56, 58 are intentionally deformable in order to perform their function as valve or handle. However, they also all have holding portions which are fixed in position relative to one another and which, when assembly is completed, are fixed in a defined relative position. The holding portion of the actuating handle 56 is the annular outer holding area surrounding the handle. The holding portion of the valve 52 is formed by the interface bearing face with which the valve 52 bears on the inside of the suction opening 34. The holding portion of the valve 58 is formed by the annular and, during operation, substantially undeformed area that rests on a bearing surface 44.

Figure 3A:
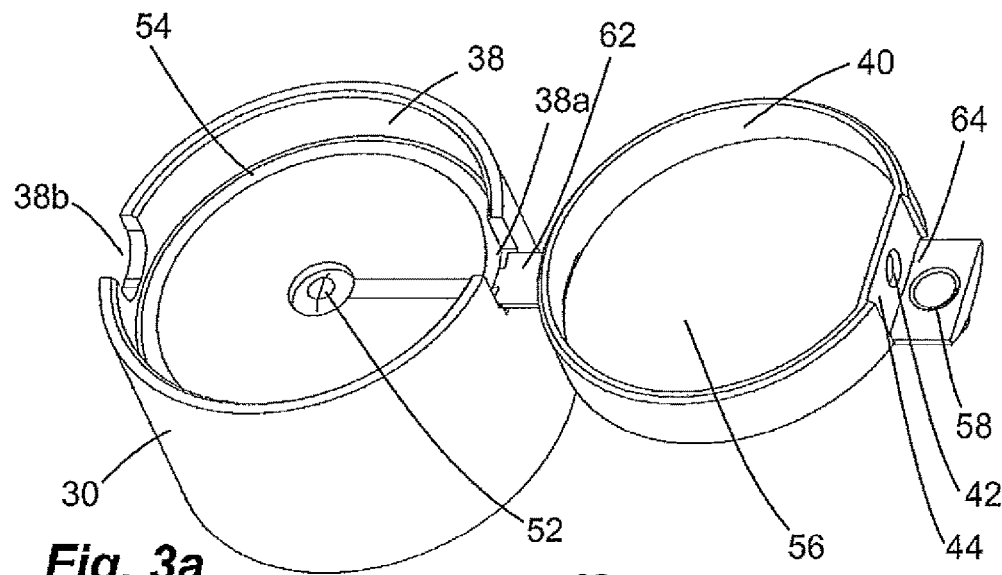
Figure 3B:
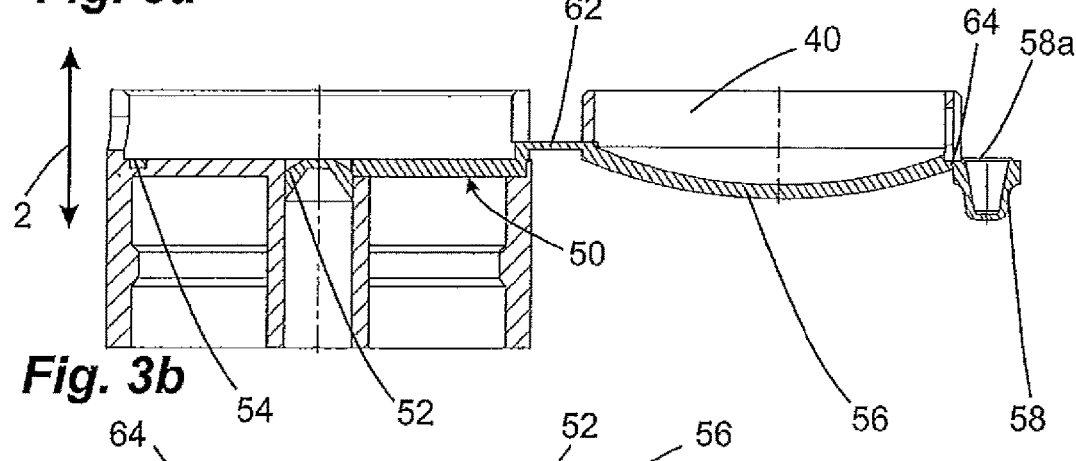

The elastic structural portion 50 is formed in one piece. All of said components from the inlet valve 52 to the outlet valve 58 have thus been produced in a common injection molding procedure. However, this is not done in the relative arrangement that said components 52 to 58 adopt in FIGS. 1 and 2, but in a relative orientation that can be seen from FIGS. 3A and 3B. Referring to FIG. 3B, it will be seen that in the production state, i.e. in the state obtained following the injection molding procedure, in the case of the elastic structural portion 50 that is not elastically deformed the orientation of the components 52 to 58 is such that a corresponding tool, in which the injection molding takes place, can be demolded in an undercut-free manner in the direction indicated by the arrow 2. The not as yet assembled applicator head, which can be seen from FIGS. 3A and 3B, can thus be produced by a uniform, two-stage injection molding procedure. First of all, the rigid structural portions 30, 40 are injection molded in an initially two-part cavity. Thereafter, the cavity is enlarged, wherein the subsidiary cavities are connected, and the elastic plastic for the elastic structural portion 50 is introduces, which again melts the two rigid structural portions in contact areas and thus produces an intimate connection between the structural portions.

After completion of this two-step two-component injection molding procedure, the rigid structural portions 30, 40 are displaced relative to each other, and in the course of this a deformation of the elastic structural portion 50 in two connection areas 62, 64 also takes place. The connection area 62 is kinked twice, in each case through 90°, such that the actuating handle 56, which is arranged next to the pump chamber provided by the first rigid portion 40 after the original production, closes this pump chamber at the top. The connection area 64 is kinked only through 90°, such that the outlet valve 58 reaches its intended position shown in FIGS. 1 and 2, in which it is oriented radially with respect to the direction 2. The outlet valve 56 is held by being clamped in a space between the second rigid structural portion 40 and the trim 38 of the first rigid structural portion 30. A high degree of leaktightness is achieved by a peripheral elevation 58a which is formed integrally on the inside of the outlet valve and which comes to rest on the bearing surface 44 of the second rigid structural portion.

Figure 4:
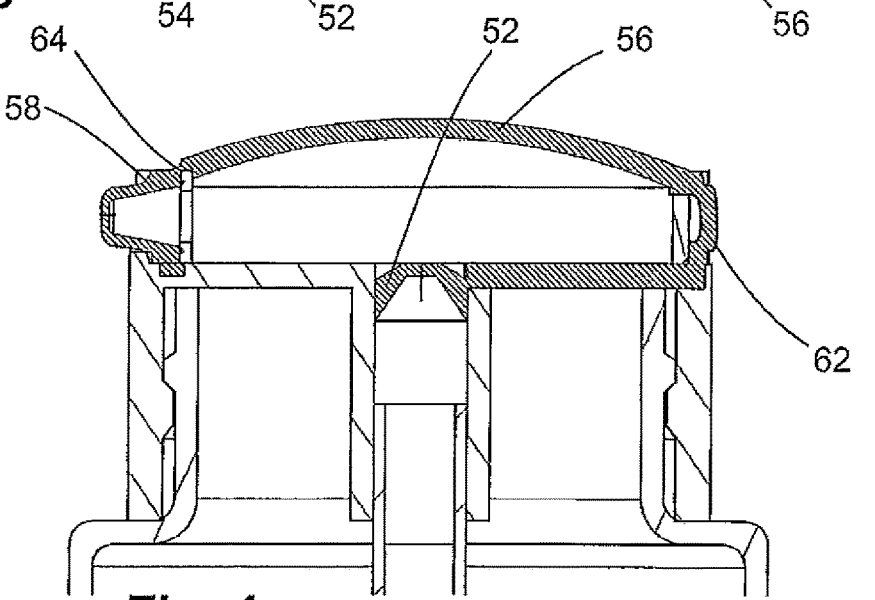
FIG. 4 shows a sectioned view of the applicator head, in this case after assembly.

In the assembled state in FIG. 4, the applicator head is ready for use. The elastic structural portion 50 is elastically deformed in the connection areas 62, 64, wherein this deformation has no negative effects on account of the fixed positioning of the rigid structural portions 40, 50. However, this elastic deformation makes it possible for the assembled applicator head shown in FIG. 4 to be constructed in the described manner from one structure which was generated in a uniform, in this case two-stage, injection molding procedure. Together with the ease of assembly, this only one injection molding procedure leads to low production costs.

The invention claimed is:

1. An applicator head for a dispenser with a pump device comprising:
 a pump chamber;
 an inlet valve arranged between a suction opening and the pump chamber;
 an outlet valve arranged between the pump chamber and an applicator opening; and
 an actuating handle by which an inner volume of the pump chamber can be changed;
 wherein at least two of the three components from the group comprising the outlet valve, the inlet valve and the actuating handle each have at least one elastic portion which is made of an elastically deformable material;
 wherein the at least one elastic portion of the at least two components are an integral part of a continuous elastic structural portion which is made of a uniform elastic material and which has a connection area between the at least two components;
 wherein the connection area, in an assembled state of the applicator head, is in an elastically deformed state;
 wherein the at least two components each have a holding portion made from the elastic material, wherein the holding portions are arranged in a fixed position with respect to one another in the assembled state of the applicator head; and
 wherein the elastic structural portion is deformed in the connection area by about 90° or a multiple thereof.

2. The applicator head as claimed in claim 1, wherein the elastic structural portion has at least three components of the four components from the group comprising the outlet valve, the inlet valve, the actuating handle and a seal, wherein at least two connection areas are provided between the at least three components and, in the assembled state of the applicator head, are each in an elastically deformed state.

3. The applicator head as claimed in claim 1, wherein the applicator head is produced in an injection mold and wherein the group comprising the outlet valve, the inlet valve and the actuating handle comprises at least two rigid structural portions made of rigid plastic that are each bonded to the at least one elastic portion, and wherein the at least two rigid structural portions, in the assembled state of the applicator head, have a relative position which is altered during a production state of the applicator head after the applicator head is removed from the injection mold, such that the at least one elastic portion is elastically deformed by about 90° or a multiple thereof in the assembled state of the applicator head.

4. The applicator head as claimed in claim 3, wherein the at least one elastic portion has a sealing portion which seals off a contact area of the at least two rigid structural portions in the assembled state of the applicator head.

5. The applicator head as claimed in claim 4, wherein the sealing portion is an axially acting seal.

6. The applicator head as claimed in claim 3, wherein:
 one of the at least two rigid structural portions has a peripheral wall portion which, to one side, is closed by the at least one elastic portion of the actuating handle, which at least one elastic portion forms a deformable actuating surface; and/or
 one of the at least two rigid structural portions has a coupling device for coupling to a liquid reservoir.

7. The applicator head as claimed in claim 3, wherein the at least two rigid structural portions have cylindrical peripheral wall portions, wherein one of the cylindrical peripheral wall portions is pushed into the other cylindrical peripheral wall portion in the assembled state of the applicator head, such that a receiving area, into which the at least one elastic structural portion extends, remains free between the cylindrical peripheral wall portions.

8. The applicator head as claimed in claim 7, wherein a surface portion of the at least one elastic portion surrounding the outlet valve is arranged in the receiving area between the cylindrical peripheral wall portions.

9. The applicator head as claimed in claim 1, wherein at least two components from the group comprising the at least one elastic portion of the outlet valve, the at least one elastic portion of the inlet valve and the at least one elastic portion of the actuating handle have a configuration which permits undercut-free demolding in a respectively specific demolding direction, wherein the at least two components, in the assembled state of the applicator head, are displaced relative to each other, in relation to a production state, in such a way that respective demolding directions thereof are oriented non-parallel to each other.

10. The applicator head as claimed in claim 1, wherein the outlet valve and/or the inlet valve are designed as valves with a closeable through-opening, wherein the through-openings are completely surrounded by the elastic material of the elastic structural portion.

11. A dispenser comprising:
a liquid reservoir; and
the applicator head as claimed in claim 1.

12. A method for producing the applicator head for a dispenser according to claim 1, wherein:
in an injection molding method, a multi-component injection-molded part is produced which has at least two structural portions made of a plastic more rigid than the uniform elastic material and the continuous elastic structural portion, wherein the at least two more rigid structural portions are connected to each other by the continuous elastic structural portion, and
during assembly, the at least two more rigid structural portions are fixed in position with respect to each other in a relative position deviating from the relative position during the injection molding, wherein the continuous elastic structural portion is elastically deformed in the process.

13. A method for producing the applicator head for a dispenser according to claim 1, wherein:
the continuous elastic structural portion is produced; and
during assembly, the at least two components are fixed in position with respect to each other in a relative position deviating from the relative position during injection molding, wherein the connection area of the continuous elastic structural portion is elastically deformed in the process.

* * * * *